Dec. 27, 1938.  A. N. ASSELIN  2,141,807

LIQUID LEVEL CONTROLLING VALVE

Filed July 18, 1938  2 Sheets-Sheet 1

Arthur N. Asselin INVENTOR

BY Victor J. Evans & Co.

ATTORNEYS

Dec. 27, 1938.　　　A. N. ASSELIN　　　2,141,807
LIQUID LEVEL CONTROLLING VALVE
Filed July 18, 1938　　　2 Sheets-Sheet 2
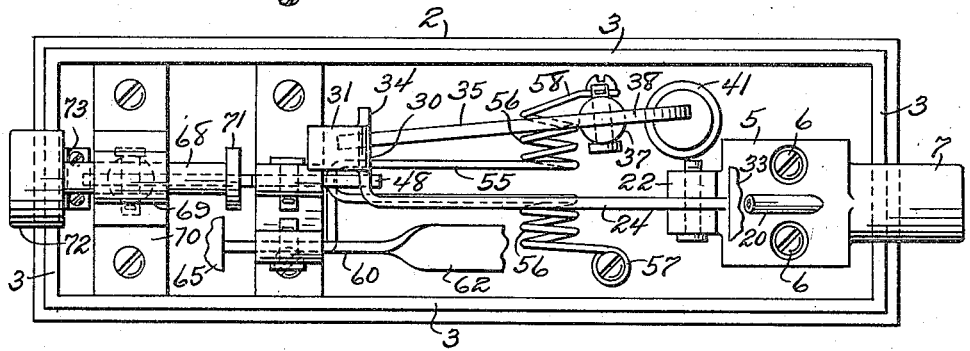
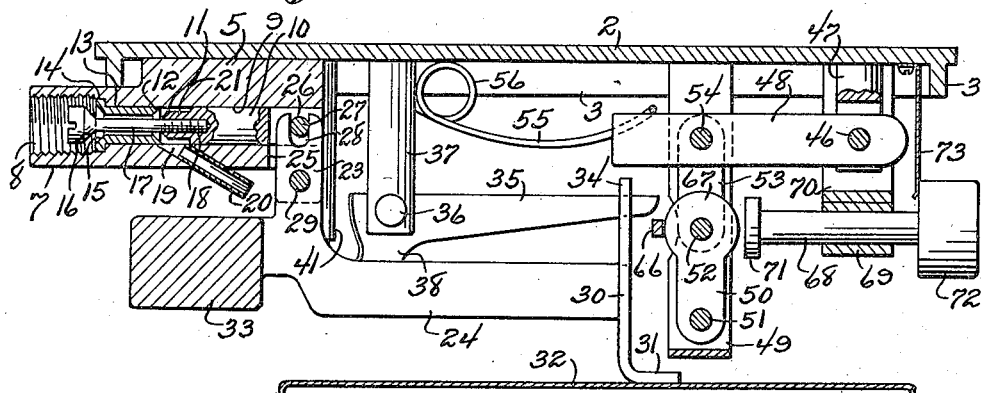
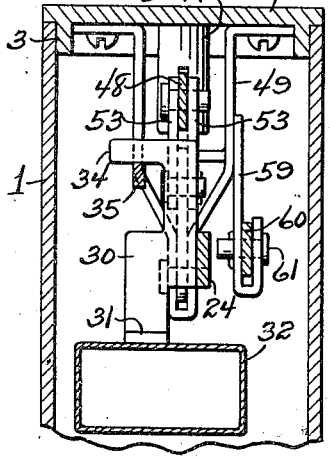
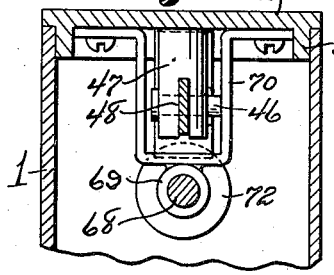
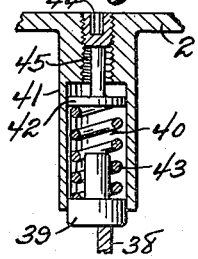
Arthur N. Asselin
INVENTOR
BY Victor J. Evans & Co.
ATTORNEYS Patented Dec. 27, 1938

2,141,807

UNITED STATES PATENT OFFICE 2,141,807

LIQUID LEVEL CONTROLLING VALVE

Arthur N. Asselin, Fall River, Mass.

Application July 18, 1938, Serial No. 219,899

4 Claims. (Cl. 137—68)

This invention relates to liquid flow controlling valves and more particularly to a device for controlling the supply of a liquid to a container constituting a part of a humidifying apparatus or other utility in which the liquid is to be maintained at a given level.

The principal object of the invention is to produce a device of this character which functions in the combined capacity of a reducing valve, check valve and safety valve and which is both pressure regulated and float controlled.

A further object is to produce a device of the character above noted which is simple and compact in structure and positive in action.

With the foregoing and other objects to be attained, as will hereinafter more fully appear, the invention consists in the general structural assembly and in the particular parts and combinations and arrangements of parts thereof as hereinafter described and set forth in the appended claims, reference being had to the accompanying drawings illustrating a practical adaptation of the invention, and in which Figure 1 is a view of the device with the casing shown in partial vertical section to expose the internal parts which are shown in normal neutral position;

Figure 4 is an inverted plan view of the casing cover removed and showing the relative positions of certain parts of the device that are carried by the cover;

Figure 5 is a longitudinal section through the cover, certain of the parts carried thereby being shown in elevation and others in longitudinal section;

Figure 6 is a fragmentary section on the line 6—6 of Figure 1;

Figure 7 is a section on the line 7—7 of Figure 1; and

Figure 8 is a section on the line 8—8 of Figure 1.

Figure 1:
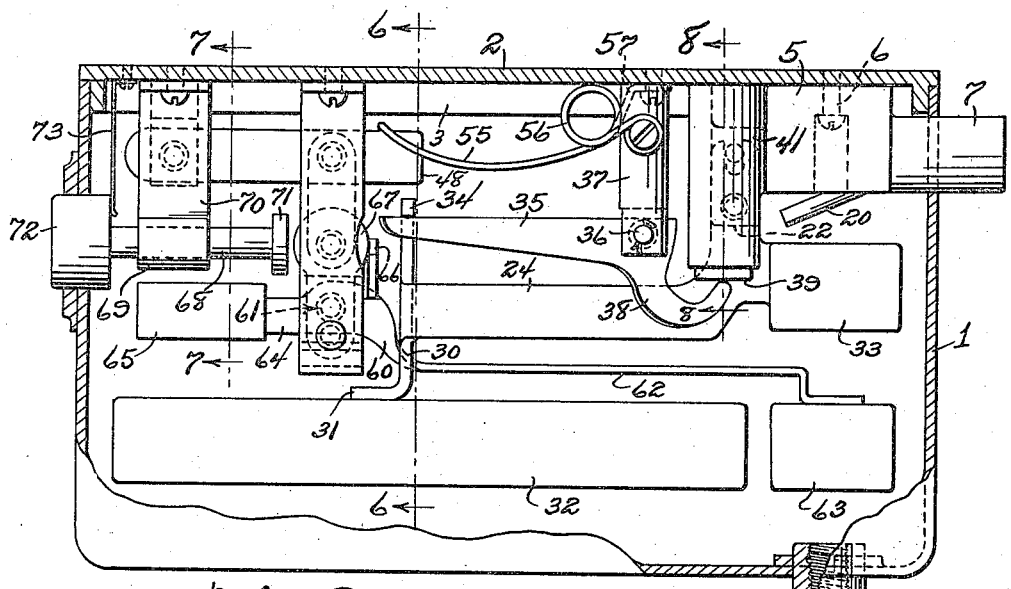
Figure 2:
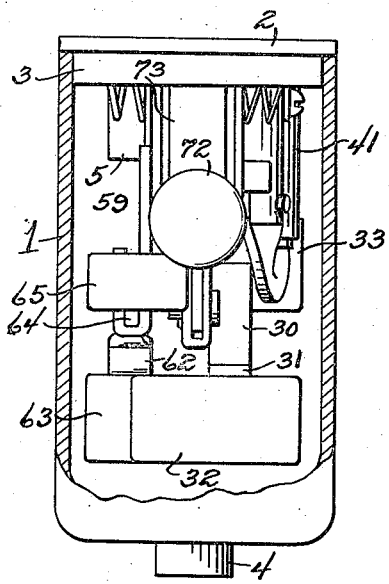
Figure 2 is an end view with the near wall broken away and the adjacent side walls in vertical section.
Figure 3:
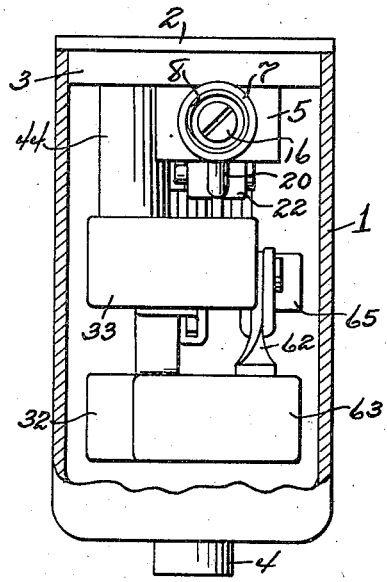
Figure 3 is a similar view of the opposite end portion of the device.

Referring now to the drawings, the numeral 1 designates a hollow casing which, as shown, is generally rectangular and provided with a removable cover 2. As shown, the cover is flanged, as at 3, adjacent its margins along its opposite longitudinal sides and ends, said flanged portions fitting snugly within the upper portion of the casing 1 and the marginal ledge surrounding said flanged portion resting on the adjacent edge portions of the side and end walls of the casing.

The casing 1 is provided in its bottom or one of its side or end walls with an outlet which, in practice, is connected communicably with a liquid receptacle (not shown) in which the liquid is to be maintained at a given level or which will determine a liquid level to be maintained in the casing 1, as will later more fully appear. As shown, the outlet is located in the bottom of the casing 1 and provided with a nipple 4 for a pipe connection with the receptacle just above mentioned.

The liquid supply to the casing 1 is through a valve unit 5 comprising a body block which is attached to the under side of the cover 2, as at 6, the attachment being effected by means of a pair of screws which are inserted through counterbored openings in the block and into aligned screw threaded openings provided therefor in the cover. The body block of the valve unit 5 is provided with a nipple extension 7 at its outer end which is projected through an opening provided therefor in the adjacent end wall of the casing 1, said nipple extension, as shown, having internally screw threaded bore 8 for the attachment of a conducting pipe from the liquid supply (not shown) said bore 8 being aligned and communicating with an elongated bore 9 of smaller diameter extending through the body block portion of the unit. Fitted slidably in the bore 9 is a reciprocatory valve plunger 10 having a seat portion 11 at its outer end to engage a counterpart seat 12 provided at the inner end of a bushing 13 which is fitted securely in the outer end portion of the bore 9. As shown, the bushing 13 is preferably provided with an annular flange 14 at its outer end to engage a counterpart shouldered seat provided at the base of the larger screw threaded bore 8 in the nipple extension 7, the adjacent outer end portion of said bushing 13 being formed with a seat 15 for the engagement of the tapered portion of a valve head 16 which is formed integrally or fixedly attached to the outer end of a stem 17 which extends inwardly through the bore of the bushing 13 with considerable clearance therebetween and has its inner end portion screw threaded, as at 18, and inserted securely in a correspondingly threaded axial bore in the outer end portion of said valve member 10. The relative distance between the valve seating portion 11 of the member 10 and the head 16 at the outer end of the stem 17 is such that when either the valve portion 11 or head 16 is engaged in its seat 12 or 15, as the case may be, the other is unseated, and the distance between said parts 11 and 16 is also such that both of said parts may be unseated at the same time as will presently be more fully described.

To provide for communication with the interior of the casing 1 through the valve unit 5, a port 19 is provided in the body block said port being diagonally disposed as more clearly shown in Figure 5 and communicating with the bore 9 adjacent the inner end of the bushing 13 and provided with a short tubular extension 20. In order to provide ample clearance for communication between the port 19 and bore of the bushing 13 the adjacent outer end portion of the valve member 10 is reduced in diameter, as at 21.

The body block of the valve unit 5 is provided at its inner end with a depending lug 22 which is slotted for the reception of an upstanding supporting arm 23 of a controlling lever 24, the slot in said lug 22 extending into the bore 9, as at 25, and registering with a longitudinal slot 26 provided in the inner end portion of the valve member 10, said valve member having a pin 27 extending crosswise of the slot 26 and engaged by the bifurcated end portion 28 of said arm 23 of the lever 24. As shown, the lever 24 is pivotally suported in the slotted lug portion 22 of the body block 5 by a cross pin 29, whereby, when the lever is oscillated said valve member 10 is correspondingly reciprocated longitudinally. Said lever 24 is elongated in the direction inwardly from the valve body block 5 and provided at its end with an upstanding bracket extension 30, the lower end portion 31 of which is rebent and has a hollow float member 32 welded or otherwise securely attached thereto, the lever having an oppositely extending arm provided with a weight 33 for counterbalancing the float 32. With the lever 24 pivotally suspended from the cross pin 29 on the bifurcated lug of the body block 5 of the valve unit and counterbalanced, as just described, the valve element 10 is normally held in a neutral position with both of the seating portions 11 and 16 away from their respective seats 12 and 15 as shown more clearly in Figure 5 of the drawings, that is to say, this is the normal position of the valve element 10 when there is no liquid pressure head against the valve element 10 to move it in either direction nor any actuating pressure exerted against the lever 24 either by the liquid level in the casing 1 affecting the position of the float 32 or some mechanical power medium acting directly upon the lever 24 as will presently more fully appear.

At the upper end of the bracket portion 30 of the lever 24 is a lateral arm 34 which overhangs the outer end portion of a lever member 35 which is pivoted, as at 36, in the bifurcated lower end portion of a suporting stud 37 depending from the cover 2. The lever member 35, as shown, has an arm 38 which extends downwardly and rearwardly from its pivotal axis 36 in a hooked formation, the end of said arm 38 abutting a spring-pressed follower 39 working in a bore 40 provided in the lower end portion of a supporting stud 41 depending from the cover 2 adjacent the supporting stud 37 for said lever member 35. Interposed between the follower 39 and an adjusting plunger 42 within the bore 40 of said supporting stud 41 is a spring element 43, the tension of which may be varied at will by adjusting a screw plug 44 which is fitted in a reduced screw threaded axial bore 45 communicating with the upper end of said bore 40, said adjusting screw 44 having provision for its manipulation externally of the cover 2. The pressure of the spring pressed follower 39 on the hooked end portion 38 of the lever member 35 rocks said lever 35 so as to lift the lever 24 whose lateral arm 34 overhangs said lever member 35 and thereby moves the valve member 10 so that its seating portion 11 engages the seat 12 of the bushing 13 which is located in the bore 9 of the body block 5 of the valve unit. For the purposes of the present invention, however, the tension of the spring element 43 is set to resist a liquid pressure in the supply connection against the valve element 10 up to a given or predetermined maximum so as to hold the valve element in a normally neutral position, as shown in Figure 5, under such pressure.

With the valve element 10 in neutral position a liquid from the source of supply flows into the casing 1 through the port 19 and tube 20 until the liquid reaches a level in the casing whereby the float 32 rises and effects the closing of the seating portion 11 of the valve element 10 against the seat 12 of the bushing 13, whereby, under ordinary conditions, a flow of the liquid into the casing 1 is effectively cut off until the level of the liquid in the casing falls sufficiently to permit the counter-balanced lever member 24 to be reversely rocked on its pivot 29 under the pressure of the fluid against the valve element 10.

While the device of the present invention as thus far described operates under normal conditions to effectively cut off the liquid supply to the casing 1, the invention further comprehends means for effectively cutting off the supply under abnormal conditions, such for example as an undue increase in presure of the fluid supply or the failure of the valve seating portion 11 to effectively engage the seat 12 of the bushing 13, as will now be described.

Pivotally mounted, as at 46, in the bifurcated lower end portion of a supporting stud 47 depending from the cover 2 is an arm 48, the free end portion of said arm overhanging the lateral extension 34 of the bracket portion 30 of said lever 24 and normally supported in limited spaced relation to said lateral extension 34 so as not to interfere with the hereinbefore described operation of the lever members 24 and 35. As shown, the support for the free end portion of the arm 48 comprises a yoke 49 depending from the cover 2, said yoke having the lower link 50 of a toggle unit pivotally mounted therein, as at 51, said link 50 being pivotally attached, as at 52, to a pair of upper links 53 of the unit which are in turn pivotally attached to the arm 48, as at 54. Normally, the toggle links 50 and 53 are set in straight dead central position with the axis of the pivots 51, 52 and 54 coinciding in the same vertical plane, in which position the arm 48 is supported with its free end elevated above the lateral extension 34 of the lever member 24 as hereinbefore noted, this relation of the arm 48 being maintained with respect to said lateral extension 34 by the provision of a spring element 55 which presses constantly on the arm 48, said spring, as shown, being of a looped and generally U-shaped form with coils 56 formed in its leg portions near its opposite ends, one end portion 57 being secured directly to the under side of the cover 2 and the opposite end portion 58 being attached to the side of the supporting stud 37 for the lever member 35.

At one side of the yoke 49 is a bracket attachment 59 in which a lever member 60 is pivotally mounted, as at 61, said lever member 60 having an elongated arm 62 at the outer end of which a float 63 is attached, said lever member having an oppositely extending arm 64 carrying a counter-weight 65. This lever member 60 is provided with an arm 66 extending upwardly therefrom and laterally into close relation to a rounded enlargement 67 of the end portion of the toggle link 50 in the region where said link 50 is pivotally attached to the upper link 53 of the toggle unit. The relative angularity of the arm 66 of the lever member 60 with respect to the pivotal axis 61 of said lever member is such that when the arm 62 of the lever 60 is raised by the lifting power of the float 63, as will be later more fully described, the lateral arm 66 presses against the rounded enlarged end portion 67 of the toggle link 50, thereby throwing the middle pivot 52 out of line with the pivots 51 and 54 and breaking the toggle unit so that the spring element 55 presses the pivotal arm 48 against the lateral extension 34 of the bracket portion 30 of the lever 24, said spring element 55 being considerably stronger than the spring element 43 also to overcome the buoyancy and lifting power of the float 32. The lever 34 is accordingly depressed and by the slot-and-pin connection between the upwardly extending arm 23 of the lever and the valve element 10 said valve element is moved inwardly in the bore 9 of the block 5 of the valve unit until the head 16 at the outer end of the valve stem 17 engages the seat 15 at the outer end of the bushing 13 in the bore 9. Thus, with the lever 24 held depressed by the spring element 55 and the pressure head of the liquid from the source of supply upon the valve head 16 the latter is held to the seat 15 and the flow of the liquid into the casing 1 is effectively checked.

To reset the pivotal arm 48 in normal position a plunger member 68 is fitted slidably in a bearing 69 provided therefor on a yoke 70 which depends from the under side of the cover 2 and straddles the supporting stud 47 on which said pivotal arm 48 is mounted. At the inner end of the plunger member 68 is an enlargement or head 71 for engagement with the rounded end enlargement 67 of the toggle link 50 at the side diametrically opposite to that engaged by the arm 66 of the lever member 60 so that by moving the plunger member 68 inwardly the toggle unit is straightened and the links 50 and 53 again set in dead central relation so as to support the arm 48 at its normal elevation whereby the valve operating and holding lever 24 is again placed under the control of the float 32 and pressure regulated lever member 35. At the outer end of the plunger member 68 is a button or knob 72 which works in an aperture provided therefor in the adjacent end wall of the casing 1, said button or knob 72 being engaged by a leaf spring 73 which depends from the under side of the cover 2, said spring 73 yieldably holding the plunger member 68 in normally retracted position with the enlargement 71 at the inner end of the plunger member a slight distance away from the toggle unit so as to offer no appreciable resistance to the braking of the toggle when the lever member 60 is actuated under the lifting power of the float 63.

In order to secure a delayed lifting action of the float 63 after the seating of the valve portion 11 upon the seat 12 under the lifting power of the float 32, and upon the liquid in the casing 1 reaching an abnormal level or a level higher than the predetermined liquid to be maintained and at which the float 32 becomes effective, as hereinbefore described, the float 63 may obviously be made proportionately smaller and with less lifting power than the float 32 so that, together with the leverage resistance to be overcome in breaking the toggle unit, which supports the spring pressed arm 48, a smaller float 63 controlling the lever 60 will not rise and effect the actuation of the lever member 60 until the body of the liquid in the casing 1 has reached a level somewhat higher than the normal predetermined level to be maintained in the casing and in which the float 32 is effective. So, too, it is obvious that instead of having the two floats 32 and 63 at the same level in their normal counter-balanced positions, as shown in Figure 1 of the drawings, and depending solely upon the comparatively smaller size of the float 63 and the working resistance to be overcome for the relative delay in its lifting action, said float 63 may be located normally at an elevation slightly higher than the float 32 and, also, sufficient lost motion may be provided between the arm 66 of the lever member 60 and the toggle unit. However, the delayed action of the float 63 is practically attained merely by the relative difference in size and lifting power of the respective floats 32 and 63 and the working resistance to be overcome by the smaller float 63 which remains inactive until the liquid level in the casing 1 becomes appreciably higher than that at which the float 32 becomes effective.

From the foregoing it is apparent that a liquid flow controlling device is produced in which the valve element functions regularly as a reducing and check valve so as to maintain a substantially constant predetermined liquid level in the casing of the device, which level may be predetermined in connection with a utilitarian container to which liquid is supplied through the controlling device of the present invention, and at the same time provision is made for operating the valve element to function as a safety valve under an abnormal condition, such as undue increase in liquid supply pressure or leakage through the valve as ordinarily set, said safety valve effect being accomplished automatically upon an appreciable rise in the liquid level within the casing of the device.

While the structure illustrated in the accompanying drawings embodies a practical adaptation of the invention, it is obvious that considerable modification may be made in the general structure and particular parts thereof without department from the spirit of the invention as defined in the appended claims. Invention, therefore, is not limited to the specific construction and arrangement shown.

What is claimed is:

1. A liquid flow and level controlling device comprising, a hollow casing having a liquid inlet provided with a valve having opposed seating portions, one portion moved against the liquid inflow and the other portion in the direction of inflow to close the valve, means for holding said valve in neutral position under given inflow fluid pressure and for closing the valve against such pressure when the liquid in the casing reaches a predetermined level, said means including a lever member cooperatively engaging the valve, a float and counter-balancing weight on said lever member, a regulatable spring-actuated element cooperating with said lever member to hold the valve in its neutral position against the given liquid inflow pressure, the float actuating said lever member to close the valve against the liquid inflow upon the liquid reaching the predetermined level in the casing, and float-controlled spring-actuated means acting to overcome said lever member and its regulatable spring-actuating means whereby to reversely close the valve in the direction of liquid inflow when the liquid rises above the predetermined level in the casing.

2. A combined reducing, check and safety valve device for controlling liquid intake and level maintenance, comprising, in combination, a hollow casing, an inflow valve unit in said casing, said unit including a body block having a bore with opposed valve seats, a reciprocatory valve element having a seating portion for engaging one of the seats in the bore to close the valve against the liquid inflow and an opposed seating portion for engaging the opposite seat in the bore to close the valve in the direction of liquid inflow, an angle lever having one of its arms cooperatively attached to the reciprocatory valve element, a float on the other arm of the lever, means for counter-balancing the float, a second lever cooperatively engaging said first mentioned lever, a regulatable spring-actuated element acting upon said second mentioned lever to hold the reciprocatory valve element in neutral opened position, the float actuating the first mentioned lever to close the valve against the liquid inflow when the liquid in the casing reaches a predetermined level, a spring-pressed actuating element normally releasably held against actuation, and float controlled means for releasing said actuating element when the liquid rises in the casing above the pre-determined level, whereby said actuating element acts upon and overcomes the power of the elements which close the valve against liquid inflow and reversely actuates the valve to close it in the direction of inflow.

3. In a liquid inflow and level controlling device, a hollow casing, the liquid intake for the casing having a reciprocatory valve element with opposed seating portions, one portion to close the valve against the liquid inflow and the other portion to close the valve in the direction of inflow, an angle lever connected to said valve element whereby to reciprocate the latter, a float on said lever, means for counter-balancing the float, a second lever engageable with said first mentioned lever, a regulatable spring-pressed actuator element acting upon said second mentioned lever to hold the valve element in a neutral opened position against a pre-determined liquid inflow pressure, the float lifting the first mentioned lever to close the valve element against the inflow when the liquid in the casing reaches a predetermined level, and means for reversely actuating said valve element to close the latter in the direction of inflow, said means comprising a spring-pressed actuator element engageable with said first mentioned lever and capable of overcoming the power of the first mentioned spring-pressed actuator acting upon the second mentioned lever and also overcoming the lifting power of the float on said first mentioned lever, a toggle unit releasably holding said second mentioned spring-pressed actuator in normal position, and float-controlled means for breaking the toggle to release said actuator when the liquid in the casing rises above the pre-determined level.

4. In a liquid inflow and level controlling device, a hollow casing, the liquid intake for the casing having a reciprocatory valve element with opposed seating portions, one portion to close the valve against the liquid inflow and the other portion to close the valve in the direction of inflow, an angle lever connected to said valve element whereby to reciprocate the latter, a float on said lever, means for counter-balancing the float, a second lever engageable with said first mentioned lever, a regulatable spring-pressed actuator element acting upon said second mentioned lever to hold the valve element in a neutral opened position against a pre-determined liquid inflow pressure, the float lifting the first mentioned lever to close the valve element against the inflow when the liquid in the casing reaches a pre-determined level, means for reversely actuating said valve element to close the latter in the direction of inflow, said means comprising a spring-pressed actuator element engageable with said first mentioned lever and capable of overcoming the lifting power of the float on said first mentioned lever, a toggle unit releasably holding said second mentioned spring-pressed actuator in normal position, float-controlled means for breaking the toggle to release said actuator when the liquid in the casing rises above the pre-determined level, and means for resetting the toggle unit to restore and hold said second mentioned spring-pressed actuator in normal position.

ARTHUR N. ASSELIN.